United States Patent
Stargardt et al.

(10) Patent No.: US 9,325,814 B2
(45) Date of Patent: Apr. 26, 2016

(54) WIRELESS SNMP AGENT GATEWAY

(75) Inventors: Wayne Stargardt, Dallas, TX (US); Steven Baker, Johns Creek, GA (US)

(73) Assignee: Numerex Corp., Atlanta, GA (US)

( * ) Notice: Subject to any disclaimer, the term of this patent is extended or adjusted under 35 U.S.C. 154(b) by 487 days.

(21) Appl. No.: 13/485,030

(22) Filed: May 31, 2012

(65) Prior Publication Data

US 2012/0311142 A1     Dec. 6, 2012

Related U.S. Application Data

(60) Provisional application No. 61/492,647, filed on Jun. 2, 2011.

(51) Int. Cl.
| | |
|---|---|
| *H04L 29/06* | (2006.01) |
| *H04W 4/00* | (2009.01) |
| *H04L 12/24* | (2006.01) |
| *H04W 88/18* | (2009.01) |

(52) U.S. Cl.
CPC ............ *H04L 69/08* (2013.01); *H04L 41/0226* (2013.01); *H04W 4/005* (2013.01); *H04W 88/18* (2013.01)

(58) Field of Classification Search
CPC .............. G06F 15/173; H04L 12/2403; H04L 41/0213; H04L 69/08; H04J 1/16
USPC .......................... 709/224; 370/216
See application file for complete search history.

(56) References Cited

U.S. PATENT DOCUMENTS

| | | | | |
|---|---|---|---|---|
| 5,991,814 A * | 11/1999 | Rzonca et al. ................ | 709/237 |
| 6,012,095 A * | 1/2000 | Thompson et al. ........... | 709/231 |
| 6,430,595 B1 * | 8/2002 | Ferguson ............ | H04L 41/0213 |
| | | | | 709/200 |
| 6,456,630 B1 * | 9/2002 | Packer et al. ................. | 370/466 |
| 6,502,131 B1 * | 12/2002 | Vaid et al. ..................... | 709/224 |
| 6,738,821 B1 * | 5/2004 | Wilson .................. | H04L 12/413 |
| | | | | 709/220 |
| 6,842,781 B1 * | 1/2005 | Lavian ................ | H04L 41/0213 |
| | | | | 707/999.102 |
| 7,024,476 B1 * | 4/2006 | Page ................... | H04L 41/0809 |
| | | | | 709/224 |
| 8,380,217 B2 * | 2/2013 | Caldwell et al. .............. | 455/453 |
| 8,782,282 B1 * | 7/2014 | Zhou ....................... | H04L 41/50 |
| | | | | 709/203 |
| 2002/0032790 A1 * | 3/2002 | Linderman ....... | G06F 17/30607 |
| | | | | 709/230 |
| 2002/0133581 A1 * | 9/2002 | Schwartz et al. ............. | 709/223 |
| 2002/0138848 A1 * | 9/2002 | Alao ..................... | H04N 21/812 |
| | | | | 725/109 |

(Continued)

OTHER PUBLICATIONS

Wikipedia, "Machine to machine", 2014.*

(Continued)

*Primary Examiner* — O. C. Vostal
(74) *Attorney, Agent, or Firm* — Bell Nunnally & Martin LLP; Craig J. Cox

(57) ABSTRACT

A system for managing communications between a group of remote machine-to-machine devices and a management platform is described where the remote devices may have disparate communication protocols. An agent gateway sits in the communication path between the remote devices and the management platform and communicates wireless with the remote devices using the native communication protocols of each device. The agent gateway includes a translator function connected to a management information base, wherein the management information base contains information relating to each machine-to-machine device and its native protocol. The agent gateway translates the messages into a standard protocol, such as SNMP, used by the network management platform allowing the network management platform to monitor and manage the remote devices using the standard network protocol.

16 Claims, 3 Drawing Sheets

(56) References Cited

U.S. PATENT DOCUMENTS

| | | | | |
|---|---|---|---|---|
| 2003/0012183 | A1* | 1/2003 | Butler et al. | 370/352 |
| 2003/0101251 | A1* | 5/2003 | Low | 709/223 |
| 2003/0182437 | A1* | 9/2003 | Kobayashi et al. | 709/232 |
| 2004/0181541 | A1* | 9/2004 | Groenendaal et al. | 707/100 |
| 2005/0027871 | A1* | 2/2005 | Bradley et al. | 709/227 |
| 2006/0067209 | A1* | 3/2006 | Sheehan | H04L 29/08846 370/216 |
| 2006/0149840 | A1* | 7/2006 | Thompson | H04L 12/5695 709/224 |
| 2006/0168070 | A1* | 7/2006 | Thompson | G06F 9/542 709/206 |
| 2006/0248208 | A1* | 11/2006 | Walbeck | H04L 29/06 709/230 |
| 2007/0054740 | A1* | 3/2007 | Salls | G07F 17/32 463/42 |
| 2007/0177192 | A1* | 8/2007 | Wang | 358/1.15 |
| 2007/0201508 | A1* | 8/2007 | Blackford et al. | 370/466 |
| 2007/0250649 | A1* | 10/2007 | Hickey et al. | 710/62 |
| 2008/0133708 | A1* | 6/2008 | Alvarado et al. | 709/218 |
| 2008/0209491 | A1* | 8/2008 | Hasek | 725/114 |
| 2009/0059939 | A1* | 3/2009 | Anderson, IV | 370/401 |
| 2009/0199259 | A1* | 8/2009 | Alao et al. | 725/147 |
| 2009/0310531 | A1* | 12/2009 | Kuehl et al. | 370/316 |
| 2010/0142538 | A1* | 6/2010 | Glover | H04L 67/327 370/400 |
| 2010/0177636 | A1* | 7/2010 | Sand et al. | 370/230 |
| 2010/0217837 | A1* | 8/2010 | Ansari et al. | 709/218 |
| 2010/0296402 | A1* | 11/2010 | Fraccalvieri et al. | 370/252 |
| 2011/0068746 | A1 | 3/2011 | Rocci et al. | |
| 2011/0201307 | A1* | 8/2011 | Segura | H04W 48/02 455/411 |
| 2012/0052857 | A1* | 3/2012 | Kumar et al. | 455/424 |
| 2012/0287854 | A1* | 11/2012 | Xie | H04W 48/08 370/328 |
| 2012/0290727 | A1* | 11/2012 | Tivig | 709/227 |
| 2013/0039262 | A1* | 2/2013 | Lim | H04B 7/155 370/315 |
| 2013/0265932 | A1* | 10/2013 | Huang | H04W 8/186 370/312 |

OTHER PUBLICATIONS

Gayraud et al., "Securing Wireless Ad Hoc Networks (MP71 Project)", 2003.*

Muller, "IEEE 802.16m Technology Introduction", 2010.*

Hjalmarsson et al., "Wireless remote control of a PLC system", 2011.*

Marks et al., "WirelessMAN-Advanced Air Interface for Broadband Wireless Access Systems", IEEE P802.16p-11/0033, 2011.*

Hadjichristofi et al., "Routing, security, resource management, and monitoring in ad hoc networks: Implemenation and integration", 2010.*

Zhang et al., "Survery of Network Management Protocols in Wireless Sensor Network", 2009.*

Aicklen et al., "Remote Control of Diverse Network Elements Using SNMP", 1995.*

Rossi et al., "D3.6—IoT Protocol Suite Definition", 2013.*

Dresler et al., "A Native ATM API Suited for Multimedia Communication".*

Macias et al., "Enforcing Service Level Agreements Using an Economically Enhanced Resource Manager", 2009.*

Simoes et al., "Integrating SNMP into a Mobile Agent Infrastructure", 1999.*

Brutzman et al., "virtual reality transfer protocol (vrtp) Design Rationale", 1997.*

Zhang et al., "Analysis of Network Management Protocols in Wireless Sensor Network", 2008.*

Choi et al., "6LoWPAN-SNMP: Simple Network Management Protocol for 6LoWPAN", 2009.*

Ryhanen, "Converting CORBA Based Fault Management to SNMP", 2009.*

Gupta, "Management of Decentralized DHT Based M2M Network", 2011.*

Enns et al., "NETCONF Configuration Protocol", RFC 4741, 2006.*

Patterson et al., "Managing a Massively-Parallel Resource-Constrained Computing Architecture", 2012.*

Whitworth, "Improving Networking by moving the network stack to userspace", 2010.*

Cha et al., "IEEE 802.16's Machine-to-Machine (M2M) Task Group", 2010.*

Peterstrom, "IP Multimedia for Municipalities: The supporting architecture", 2009.*

Ahlinder et al., "Accelerating Adoption of IPv6", 2011.*

* cited by examiner

WIRELESS SNMP AGENT GATEWAY

CROSS REFERENCE TO RELATED INFORMATION

This application claims the benefit of U.S. Provisional Patent Application Ser. No. 61/492,647, filed Jun. 2, 2011.

TECHNICAL FIELD

The present disclosure is directed to machine-to-machine communications and more specifically to a gateway to allow machine-to-machine devices to communicate over cellular connections using SNMP.

BACKGROUND OF THE INVENTION

SNMP (Simple Network Management Protocol) is a mature, well-established, and widely deployed protocol for monitoring and managing large, complex multi-node computer and telecommunications networks. It provides simple data discovery, modification, and notification mechanisms for devices, which allows SNMP management platforms to easily manage disparate devices without requiring extensive foreknowledge of the details of those devices. As a result, it is being increasingly applied to manage more than computer and telecommunications networks.

Existing SNMP management platforms are required to introduce cellular device and network specific protocols into their systems in order to manage and monitor machine-to-machine ("M2M") devices. In addition, managed devices are required to implement some support for the SNMP protocol. This approach resulted in relatively high development costs creating a barrier to new feature introduction and a high coupling between the management platform and the cellular and device characteristics, making on-going support and new device introduction cost prohibitive. Additionally, SNMP imposes unnecessarily high network traffic leading to prohibitive data usage charges. Lastly, SNMP is not highly compatible with the high latencies, intermittent connections and sessions, dynamic addressing and carrier roaming characteristics of cellular wireless communications.

BRIEF SUMMARY OF THE INVENTION

In a preferred embodiment, a Simple Network Management Protocol gateway is described that includes a device interface for communicating with machine-to-machine devices in their native protocols over wireless networks. The gateway further includes an internet interface connecting the gateway to an SNMP management platform, and a translator function connected to a management information base, where the management information base contains information relating to each machine-to-machine device and its native protocol. The gateway is operable to allow the SNMP network management platform to monitor and manage remote disparate machine-to-machine devices over multiple, disparate, wireless networks.

In another embodiment, a method for communicating between a machine-to-machine device and an SNMP management platform is described. The method includes receiving a message over a wireless network at a gateway from the machine-to-machine device in its native M2M protocol, and accessing a management information base in the gateway to retrieve definitions for machine-to-machine device. The method further includes translating the message from the native M2M protocol to the SNMP format, and sending the SNMP formatted message to the SNMP management platform over a second network.

In yet another embodiment a system is described that includes a plurality of remote devices, the remote devices having disparate communication protocols. An agent gateway is in communication with the plurality of remote devices over one or more wireless networks using the disparate communication protocols associated with each of the plurality of remote devices. The agent gateway includes a translator function connected to a management information base, wherein the management information base contains information relating to each machine-to-machine device and its native protocol. A network management platform is in communication with the agent gateway and operable to send and receive communications in a standard network protocol, such that the agent gateway is operable to allow the network management platform to monitor and manage the remote devices by translating between the disparate communications protocols of remote devices and the standard network protocol of the network management protocol.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The concepts described herein describe an approach to enabling a server-based SNMP management application to monitor and manage remote M2M devices over cellular connections using an SNMP agent gateway for M2M devices. This SNMP agent gateway allows SNMP management platforms to support M2M devices and applications using the platform's native data query and communications mechanisms based on SNMP.

Figure 1:
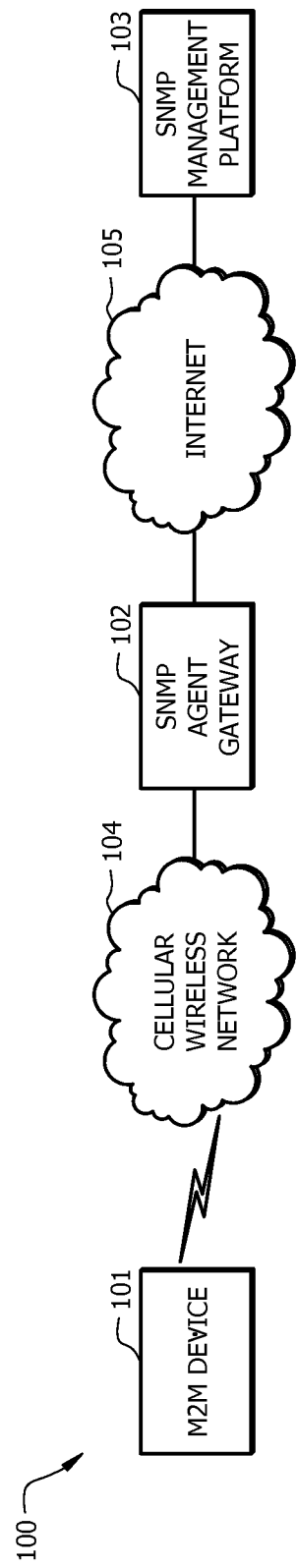
FIG. 1 is a network diagram of an embodiment of a system incorporating an agent gateway according to the concepts described herein.

Referring now to FIG. 1, embodiments of the present invention place an agent gateway 102 between the server-based SNMP management application 103 and the cellular network 104. The agent gateway 102 emulates an SNMP agent for each remote or mobile device 101, while communicating with the remote device 101 using a more efficient, robust and native M2M protocol. The agent gateway 102 will translate messages and data content between the SNMP protocol and the native M2M protocol of the remote device 101, for both cases in which the remote device 101 is sending to the SNMP manager 103 and in which the SNMP manager 103 is sending to the remote device 101.

As the cellular network 104 is used only to transmit between agent gateway 102 and M2M device 101, the use of the cellular network is reduced by the more efficient native M2M protocol. The SNMP transmissions, which are less efficient than the native M2M protocols are then transmitted over a traditional network, such as the Internet 105. In this way the insertion of the agent gateway 102 into communications path between management platform 103 and M2M device 101 reduces the operating costs for the M2M devices by lowering cellular charges associated with the devices, in addition to the improved communications flow between the devices and the management platform.

While FIG. 1 shows an embodiment using particular types of networks, particularly a cellular network between the M2M device 101 and agent gateway 102, the present invention can apply to the use of any type of transmission medium between the agent gateway 102 and M2M devices 101 and management platform 103. For example either communications network can be replaced by any combination of cellular networks, data networks, Wi-Fi, WiMax, satellite, radio frequency or other communications interface or network. Also while only one mobile device and management platform is shown in FIG. 1, agent gateway 102 may be configured to interface with any number of mobile device and management platforms without departing from the scope of the concepts described herein.

Figure 2:
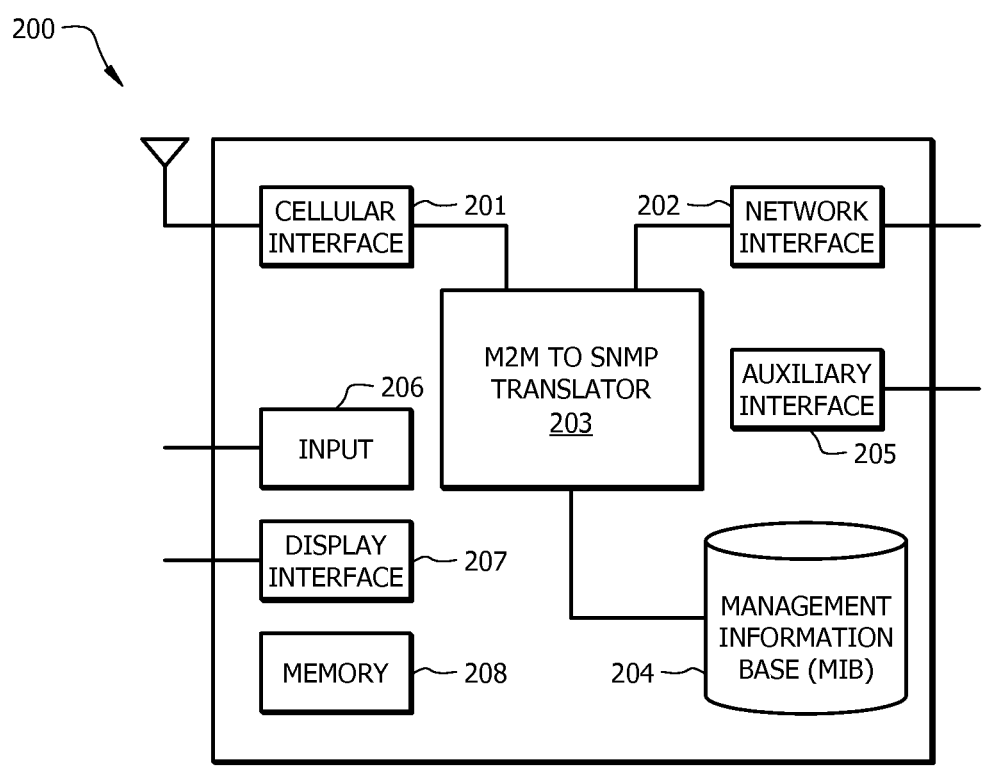
FIG. 2 is a block diagram of an embodiment of an agent gateway according to the concepts described herein.

Referring now to FIG. 2, an embodiment of an agent gateway according to the concepts described herein is shown. Agent gateway 102 includes both a cellular interface 201 to communicate with M2M devices, and a network interface 202 to communicate with the SNMP management platform. Agent gateway 102 may also, but does not necessarily include other functionality such as input interface 206 to allow connection of input devices such as a keyboard, a mouse, etc., and a display interface 207 to allow connection of a display or other mechanism for providing visual information to a user of the agent gateway 102. Memory 208 can be included to store configuration, programming and other information that is used to operate agent gateway 102. Auxiliary input 205, when present, allows for the connection of other devices and peripherals such as diagnostic equipment and other input devices or interfaces.

The heart of agent gateway 102 is the M2M to SNMP translator 203 which is operable to map messages between the two formats. An SNMP Management Information Base (MIB) 204 appropriate to the application is implemented in both the SNMP server 103 from FIG. 1 and the agent gateway 102. The agent gateway 102 will map MIB 204 data elements to the data model used by the M2M device 101. For example, an M2M mobile tracking device with GPS will produce data on its location (e.g., latitude, longitude, speed, direction, accuracy, etc). It will also accept commands and data to define a "geofence," a defined boundary which will cause the device to send an alert message if crossed.

The invention in this case is to define a MIB 204 for the device that defines the data produced by the device, the commands and data accepted by the device, and alert messages that are sent by the device. Furthermore, an agent gateway according to the concepts described herein takes messages from the device in the device's native format with location information, and to translate those messages into SNMP messages to the management server. Furthermore, in preferred embodiments agent gateway 102 using MIB 204 accepts commands and data from the SNMP server, and translates those into messages appropriate and specific to the target device, such as for defining a geofence.

Furthermore, the embodiments of the agent gateway in the present example handle device identification or address translations between the SNMP server and the cellular connected device, handle intermittent connections with the device over the wireless network (i.e., store and forward), and perform other communications mechanisms (e.g., flow control, acknowledgement of receipt) required by the SNMP server but which are not appropriate to impose on the device or the cellular transport network.

One advantage of particular embodiments of a system according to the concepts described herein is that it enables an SNMP network management server to monitor and manage remote disparate M2M devices over multiple, disparate, cellular networks in a cost effective and fully functional manner, without requiring any significant changes to standard SNMP management platforms.

Another advantage of particular embodiments of a system according to the concepts described herein is that it de-couples the cellular-specific characteristics from the SNMP management platform thus greatly reducing the barriers for introduction of this capability while promoting wider application across cellular M2M network and device technologies.

Figure 3:
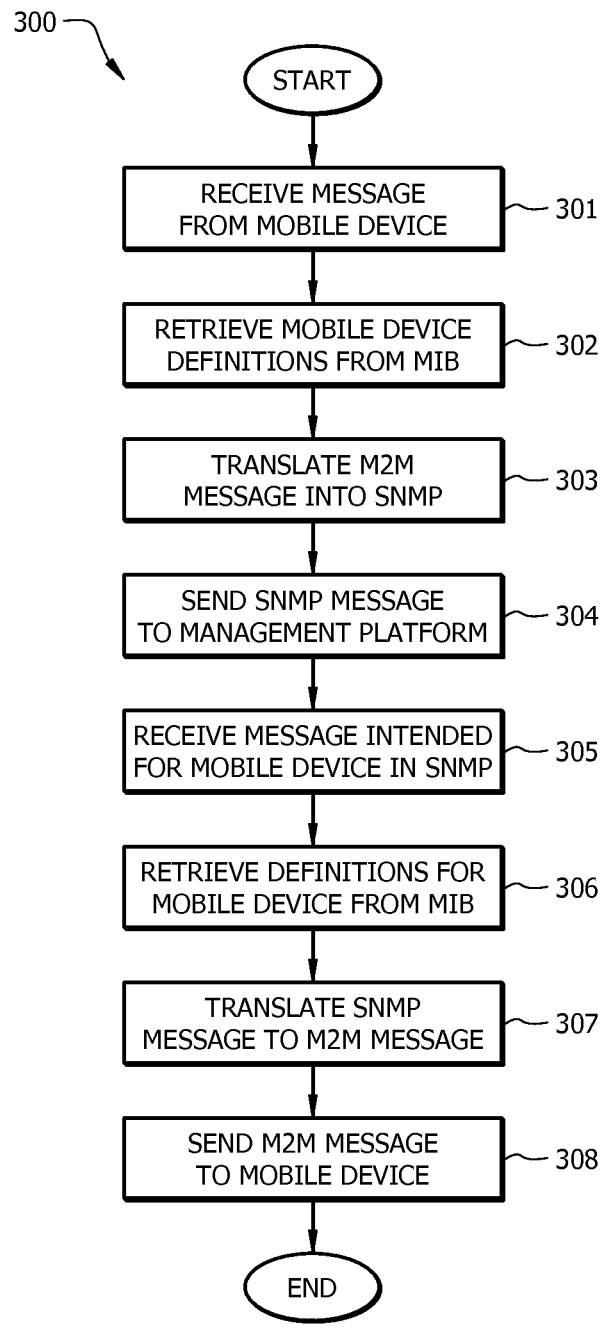
FIG. 3 is a flow chart showing an embodiment of a method of employing an agent gateway according to the concepts described herein.

Referring now to FIG. 3, a method for translating messages between an M2M device using a native M2M protocol and a SNMP management platform using SNMP is described. Reference will also be made to the system shown in FIG. 1 and the agent gateway described in FIG. 2 for reference. Process 300 may begin with the receipt of a message from a remote or mobile M2M device, as shown by block 301 at an agent gateway. The agent gateway, as shown in block 302, then retrieves the device definitions for that mobile device from the MIB 204 to allow the M2M protocol being used by that device to be mapped into SNMP. Once the definitions have been retrieved, the agent gateway 102 translates the M2M message into SNMP, shown by block 303, and then sends the translated SNMP message to the management platform 103 over a traditional network 105.

Process 300 may continue by receiving a message at agent gateway 102 from the management platform 103, as shown by block 305. The agent gateway 102 identifies the mobile device targeted by the message and retrieves the appropriate definitions from the MIB 204, as represented by block 306. The SNMP message is then translated into the appropriate M2M protocol for the target mobile device, as shown by block 307 and is then transmitted over the cellular network to the target device, as represented in block 308. While a particular sequence of message flow has been described with reference to FIG. 3, the example is not intended to be limiting and any sequence of message flows may be accommodated by the agent gateway and MIB as described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A Simple Network Management Protocol gateway comprising:
    a machine-to-machine device interface connecting the gateway to machine-to-machine devices using protocols native to each machine-to-machine device over wireless networks;
    an internet interface connecting the gateway to an SNMP management platform; and
    a translator function connected to a management information base, wherein the management information base contains information relating to each machine-to-machine device and its native protocol;
    wherein the gateway is operable to allow the SNMP network management platform to monitor and manage remote disparate machine-to-machine devices over multiple, disparate, wireless networks and wherein the gateway is operable to provide flow control and acknowledgement of receipt services required by the SNMP network management platform; and
    wherein the protocols native to each machine-to-machine device are more efficient than a SNMP protocol.

2. The gateway of claim 1 wherein the wireless networks are cellular networks.

3. The gateway of claim 1 wherein the gateway communicates with the SNMP management platform over a broadband data network.

4. The gateway of claim 1 wherein the gateway is operable to provide device identification or address translations between the SNMP network management platform and the machine-to-machine devices.

5. The gateway of claim 1 wherein the gateway is operable to manage intermittent connections with the machine-to-machine devices over the wireless network to provide "store and forward" functionality.

6. The gateway of claim 1 wherein the wireless networks are one or more of: Wi-Fi networks, WiMax networks, radio frequency, and satellite.

7. A method for communicating between a machine-to-machine device and an SNMP management platform, the method comprising:
    receiving a message over a cellular network at a gateway from the machine-to-machine device in its native M2M protocol;
    accessing a management information base in the gateway to retrieve definitions for machine-to-machine device;
    translating the message from the native M2M protocol to the SNMP format;
    sending the SNMP formatted message to the SNMP management platform over a second network; and
    providing flow control and acknowledgement of receipt services required by the SNMP network management platform;
    wherein the native M2M protocol is more efficient than the SNMP format.

8. The method of claim 7 wherein second network is a broadband data network.

9. The method of claim 7 further comprising providing device identification or address translations between the SNMP network management platform and the machine-to-machine devices.

10. The method of claim 7 further comprising managing intermittent connections with the machine-to-machine devices over the wireless network to provide "store and forward" functionality.

11. The method of claim 7 wherein the wireless networks are one or more of:
    Wi-Fi networks, WiMax networks, radio frequency, and satellite.

12. A system comprising:
    a plurality of remote devices, the remote devices having disparate communication protocols;
    an agent gateway in communication with the plurality of remote devices over one or more wireless networks using the disparate communication protocols associated with each of the plurality of remote devices, the agent gateway including a translator function connected to a management information base, wherein the management information base contains information relating to each machine-to-machine device and its native protocol; and
    a network management platform in communication with the agent gateway and operable to send and receive communications in a standard network protocol;
    wherein the agent gateway is operable to allow the network management platform to monitor and manage the remote devices by translating between the disparate communications protocols of the remote devices and the standard network protocol of the network management protocol wherein the disparate communications protocols are more efficient than the standard network protocol, and wherein the agent gateway is operable to provide flow control and acknowledgement of receipt services required by the SNMP network management platform.

13. The system of claim 12 wherein the standard network protocol is SNMP.

14. The system of claim 12 wherein the one or more wireless networks include a cellular network.

15. The system of claim 12 wherein the one or more wireless networks are one or more of: cellular networks, Wi-Fi networks, WiMax networks, radio frequency, and satellite.

16. The system of claim 12 wherein the network management platform communicates with the agent gateway over a broadband data network.

* * * * *